United States Patent [19]

Kamoi et al.

[11] Patent Number: 5,107,495
[45] Date of Patent: Apr. 21, 1992

[54] FRAME SYNCHRONIZATION SYSTEM

[75] Inventors: Nobuhisa Kamoi, Tokyo; Yuji Takahashi, Kawasaki; Koji Ikuta, Oyama, all of Japan

[73] Assignee: Fujitsu Limited, Kawasaki, Japan

[21] Appl. No.: 540,633

[22] Filed: Jun. 20, 1990

[30] Foreign Application Priority Data

Jun. 20, 1989 [JP]  Japan ................................. 1-157936

[51] Int. Cl.⁵ ................................................ H04J 3/06
[52] U.S. Cl. .............................. 370/105.1; 370/100.1; 375/108; 371/47.1
[58] Field of Search ............... 370/100.1, 105.1, 105.4, 370/105.5, 106, 108; 375/106, 108, 113, 114, 116, 118; 371/5.4, 47.1

[56]  References Cited

U.S. PATENT DOCUMENTS

| | | | |
|---|---|---|---|
| 4,748,623 | 5/1988 | Fujimoto | 370/105.1 |
| 4,794,626 | 12/1988 | Tanabe et al. | 370/105.1 |
| 4,811,367 | 3/1989 | Tajika | 375/108 |
| 4,965,814 | 10/1990 | Yoshida et al. | 375/118 |
| 5,014,272 | 5/1991 | Yoshida | 370/105.1 |
| 5,020,057 | 5/1991 | Taniguchi et al. | 370/105.1 |

*Primary Examiner*—Douglas W. Olms
*Assistant Examiner*—Alpus H. Hsu
*Attorney, Agent, or Firm*—Staas & Halsey

[57] ABSTRACT

A frame synchronization system includes a synchronization detector supplied with a digital signal including frame synchronizing pulses for outputting the digital signal in a frame synchronization state, an adding part for adding a forward guard identification code to the digital signal output from the synchronization detector when a forward guard information is received from the synchronization detector, a first memory for storing the digital signal including the forward guard identification code output from the adding part, a detector for monitoring the digital signal read out from the first memory and for outputting forward guard detection information when the digital signal read out from the first memory includes the forward guard identification code, a second memory for storing the digital signal read out from the first memory in response to a control signal, where the digital signal read out from the second memory is output as an output signal of the frame synchronization system, and a controller for producing the control signal which controls write and read operations of the first and second memories in response to synchronization error information and the forward guard detection information. The synchronization error information is output when a synchronization error of the digital signal is detected and the forward guard information is output from a time when an abnormality of the frame synchronizing pulses is detected to a time when the synchronization error is detected. The control signal prohibits the digital signal read out from the first memory from being stored in the second memory when the controller receives at least one of the synchronization error information and the forward guard detection information.

6 Claims, 8 Drawing Sheets

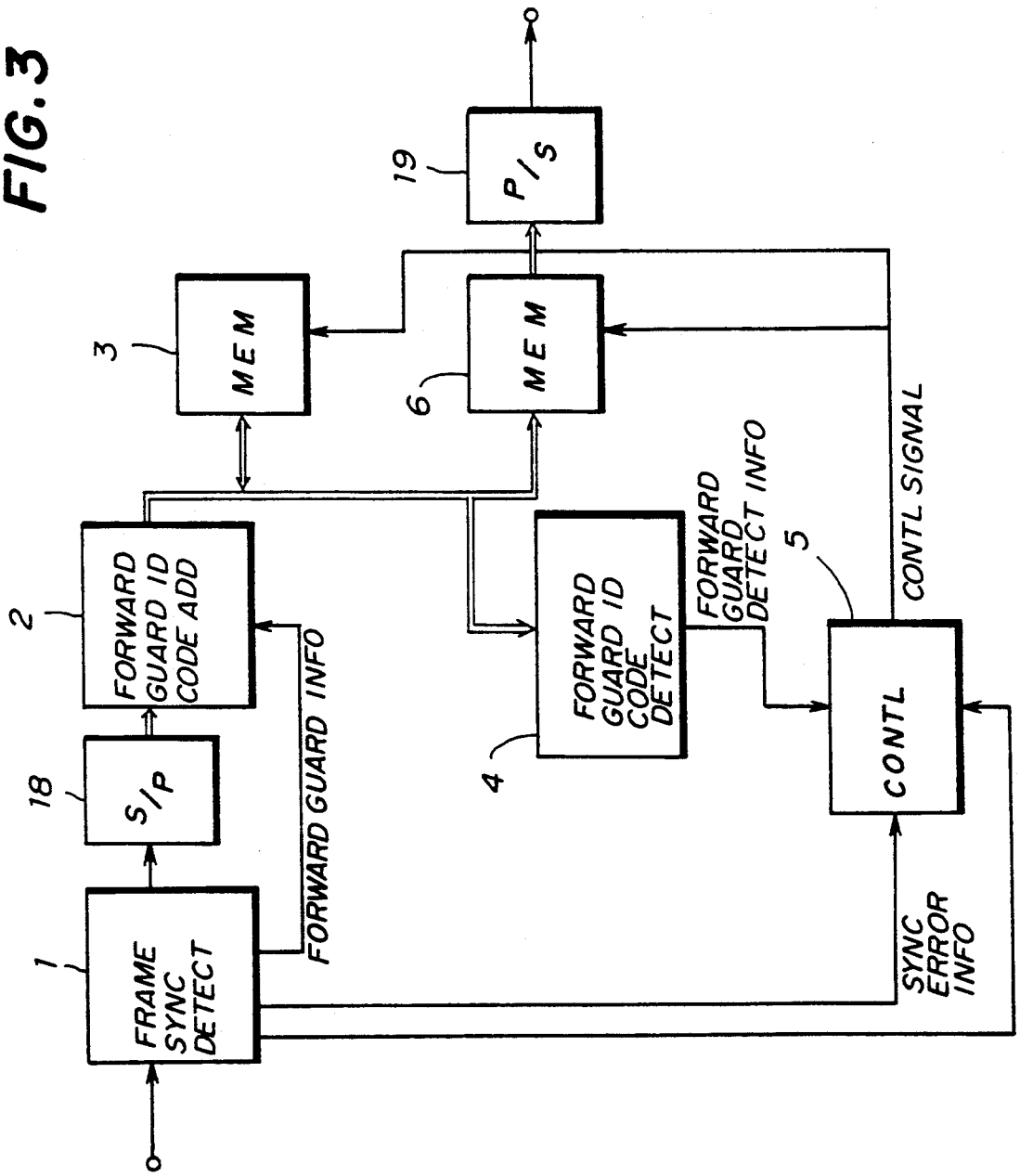

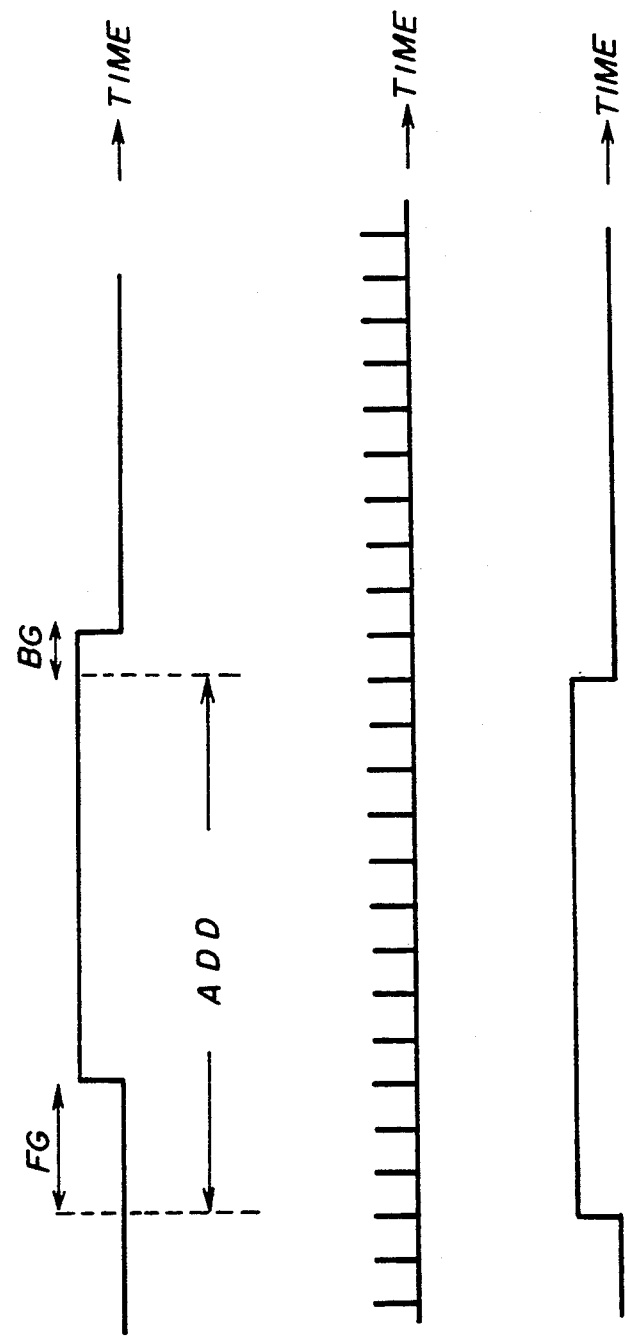

FRAME SYNCHRONIZATION SYSTEM

BACKGROUND OF THE INVENTION

The present invention generally relates to frame synchronization systems, and more particularly to a frame synchronization system for digital transmission systems.

In digital transmission systems, digital signals in units of channels are time-division-multiplexed and transmitted. In order to multiplex and demultiplex the channels, a synchronizing process is carried out in a network or transmission line.

There are various methods of carrying out the synchronization, and different methods are employed depending on the structure of the network or transmission line or depending or the multiplicity. A commonly used frame synchronization method distinguishes the frame by inserting a frame synchronizing pulse into one period of a group of pulses (hereinafter referred to as a frame) which is formed by multiplexing a plurality of channels. The frame synchronizing pulse which is inserted may comprise of one bit for one frame or a pattern including a plurality of bits for one frame. According to the former method, the frame synchronization is detected from a pattern of the frame synchronizing pulses in a plurality of frames (hereinafter referred to as multiframes). On the other hand, according to the latter method, the frame synchronization can be detected from one frame, but the frame synchronization is in many cases detected from multiframes. For this reason, it is hereinafter assumed for the sake of convenience that the frame synchronization is detected from multiframes.

When the pattern of the frame synchronizing pulses is distorted for some reason in the above described frame synchronization system, a frame synchronization detector part detects a synchronization error and a measure is taken so as not to output the digital signal from a frame synchronization processing part. However, it takes time to correct the synchronization error and the signal transmission is stopped during this time. For this reason, there is provided a means for not detecting the synchronization error when a code error of only one bit exists.

The above described means does not detect the synchronization error immediately when the pattern of the frame synchronizing pulses does not match a predetermined pattern, but detects the synchronization error only when the pattern of the frame synchronizing pulses does not match the predetermined pattern N times and then carries out the operation of correcting the synchronization error. A time interval from a time when it is detected that the pattern cf the frame synchronizing pulses does not match the predetermined pattern to a time when the synchronization error is detected is called a forward guard. Accordingly, the frame synchronization processing part outputs the digital signal even during the forward guard, but the synchronization error may be generated from the time when it is first detected that the pattern of the frame synchronizing pulses does not match the predetermined pattern. In other words, there is a possibility that the digital signal output from the frame synchronization processing part during the forward guard includes an error.

On the other hand, digital transmission lines and a digital switching system are often coupled. However, the digital signal which is transmitted to the digital switching system via the digital transmission line includes not only audio information but also control information for controlling the digital switching system, accounting information, testing information and the like. Hence, a serious erroneous operation or erroneous judgement may be made even when an error of one bit exists in the digital signal which is transmitted to the digital switching system.

For this reason, the necessity to take measures so that the digital signal which may include an error is not transmitted to the digital switching system during the forward guard is increasing, and there is a demand to mask the digital signal during the forward guard.

FIG. 1 shows an example of a conventional frame synchronization system. When a digital signal from a transmission line is input to a frame synchronization detector part 21 in FIG. 1, the frame synchronization detector part 21 detects synchronization from frame synchronizing pulses. The digital signal is supplied to a serial-to-parallel (S/P) converter part 26 after the synchronization is corrected. The digital signal which is transmitted serially on the transmission line is converted into parallel signals in the S/P converter part 26 and stored in an input signal memory 22. The digital signal stored in the input signal memory 22 is supplied to a buffer memory 24 under a control of a write controller part 23, and is further supplied to a parallel-to-serial (P/S) converter part 27. The P/S converter part 27 converts the digital signal into a serial signal and this serial signal is output as an output signal of the frame synchronization system.

When the digital signal is transferred from the input signal memory 22 to the buffer memory 24, the digital signal is monitored by a code error detector part 25 wherein the code error is detected by a parity check or the like. When the code error is detected in a certain time slot, a signal of one frame before and is related to the same time slot as the certain time slot is transmitted from the buffer memory 24, for example.

When the synchronization error is detected by the frame synchronization detector part 21 during the above described process, synchronization error information is supplied from the frame synchronization detector part 21 to the write controller part 23. Hence, the write controller part 23 writes a fixed pattern having all "1"s into the input signal memory 22 in place of the digital signal which is output from the S/P converter part 26, or writes the digital signal output from the S/P converter part 26 but does not transfer the digital signal to the buffer memory 24. In the latter case, the digital signal which is written into the buffer memory 24 before the synchronization error occurs is retransmitted as the output signal.

However, when carrying out the above described frame synchronization process, no means is provided for distinguishing the signal during the forward guard from the signal during the synchronized state. For this reason, the write controller part 23 does not carry out a process such as stopping the output of the digital signal during the forward guard, and an erroneous signal is output if the synchronization error occurs during the forward guard.

SUMMARY OF THE INVENTION

Accordingly, it is a general object of the present invention to provide a novel and useful frame synchronization system in which the problems described above are eliminated.

Another and more specific object of the present invention is to provide a frame synchronization system includes frame synchronization detector means supplied with a digital signal including frame synchronizing pulses for outputting the digital signal in a frame synchronization state, where the frame synchronization detector means has means for outputting synchronization error information when a synchronization error of the digital signal is detected and means for outputting forward guard information from a time when an abnormality of the frame synchronizing pulses is detected to a time when the synchronization error is detected, forward guard identification code adding means for adding a forward guard identification code to the digital signal output from the frame synchronization detector means when the forward guard information is received from the frame synchronization detector means, first memory means for storing the digital signal including the forward guard identification code output from the forward guard identification code adding means, forward guard identification code detector means for monitoring the digital signal read out from the first memory means and for outputting forward guard detection information when the digital signal read out from the first memory means includes the forward guard identification code, second memory means for storing the digital signal read out from the first memory means in response to a control signal, the digital signal read out from the second memory means being output as an output signal of the frame synchronization system, and signal transfer controller means for producing a control signal controlling write and read operations of the first and second memory means in response to the synchronization error information and the forward guard detection information, where the control signal prohibits the digital signal read out from the first memory means from being stored in the second memory means when the signal transfer controller means receives at least one of the synchronization error information and the forward guard detection information. According to the frame synchronization system of the present invention, the digital signal during the forward guard will not be output from the frame synchronization system. For this reason, it is possible to positively prevent a serious erroneous operation or erroneous judgement even when control, accounting, judgement of a test result and the like are carried out based on the output signal of the frame synchronization system. Therefore, the reliability of the frame synchronization process is improved.

Other objects and further features of the present invention will be apparent from the following detailed description when read in conjunction with the accompanying drawings.

BRIEF DESCRIPTION OF THE DRAWINGS

FIG. 3 is a system block diagram showing a second embodiment of a frame synchronization system according to the present invention;

FIGS. 4A through 4C, 5A through 5C, 6A, 6B, 7A and 7B are timing charts for explaining the operation of the second embodiment.

DESCRIPTION OF THE PREFERRED EMBODIMENTS

Figure 1:
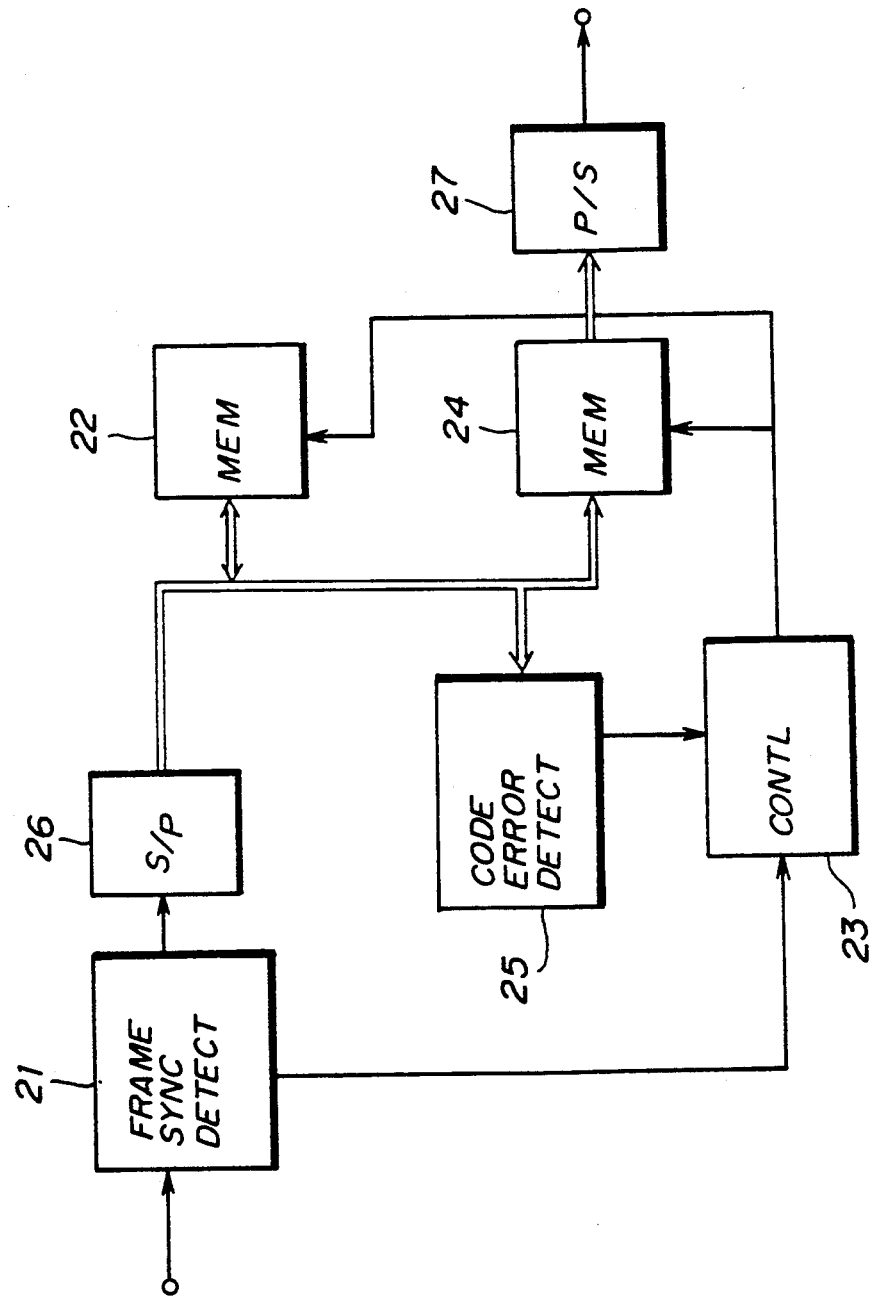
FIG. 1 is a system block diagram showing an example of a conventional frame synchronization system.

First, a description will be given of a first embodiment of a frame synchronization system according to the present invention, by referring to FIG. 2. The frame synchronization system includes a frame synchronization detector part 1, a forward guard identification code adding part 2, an input signal storage part 3, a forward guard identification code detector part 4, a signal transfer controller part 5, and an output signal storage part 6 which are connected as shown.

The frame synchronization detector part 1 receives a digital signal including frame synchronizing pulses and outputs the digital signal after frame synchronization is achieved. When the frame synchronization detector part 1 detects a synchronization error, the frame synchronization detector part 1 outputs synchronization error information. In addition, the frame synchronization detector part 1 outputs forward guard information during a forward guard state from a time when an abnormality of the frame synchronizing pulses is detected to a time when the synchronization error is detected.

The forward guard identification code adding part 2 receives the digital signal from the frame synchronization detector part 1 and adds a forward guard identification code to the digital signal when the forward guard information is received from the frame synchronization detector part 1.

The input signal storage part 3 receives from the forward guard identification code adding part 2 the digital signal which may include the forward guard identification code, and stores the digital signal under a control of the signal transfer controller part 5.

The forward guard identification code detector part 4 monitors the digital signal which is read from the input signal memory 3 and detects the forward guard identification code within the digital signal. The forward guard identification code detector part 4 supplies forward guard detection information to the signal transfer controller part 5 when the forward guard identification code is detected.

The signal transfer controller part 5 carries out a control so that the digital signal which is stored in the input signal storage part 3 is transferred to the output signal storage part 6 and output as an output signal of the frame synchronization system when no abnormality is detected in the digital signal. In addition, when the signal transfer controller part 5 receives the synchronization error information from the frame synchronization detector part 1 or the forward guard detection information from the forward guard identification code detector part 4, the signal transfer controller part 5 carries out a control so that the digital signal stored in the input signal storage part 3 is not stored in the output signal storage part 6.

Under the control of the signal transfer controller part 5, the output signal storage part 6 stores the digital signal which is stored in the input signal storage part 3 and outputs the digital signal as the output signal of the frame synchronization system. However, by the control of the signal transfer control part 5, the output signal storage part 6 does not store the digital signal which is added with the forward guard identification code. In this case where the digital signal is added with the forward guard identification code, the digital signal of one frame before the forward guard is generated is stored in a signal region of the output signal storage part 6 where storage of the digital signal added with the forward guard identification code is prohibited by the signal transfer controller part 5. Hence, the digital signal of one frame before is output as the output signal of the frame synchronization system in this case.

The frame synchronization is made in a unit of multiframes. The forward guard identification code is set in the unit of multiframes for each time slot within the frame.

Therefore, according to the first embodiment, the digital signal during the forward guard is not output from the frame synchronization system.

Next, a description will be given of a second embodiment of the frame synchronization system according to the present invention, by referring to FIG. 3. In FIG. 3, those parts which are basically the same as those corresponding parts in FIG. 2 are designated by the same reference numerals, and a description thereof will be omitted.

Figure 2:
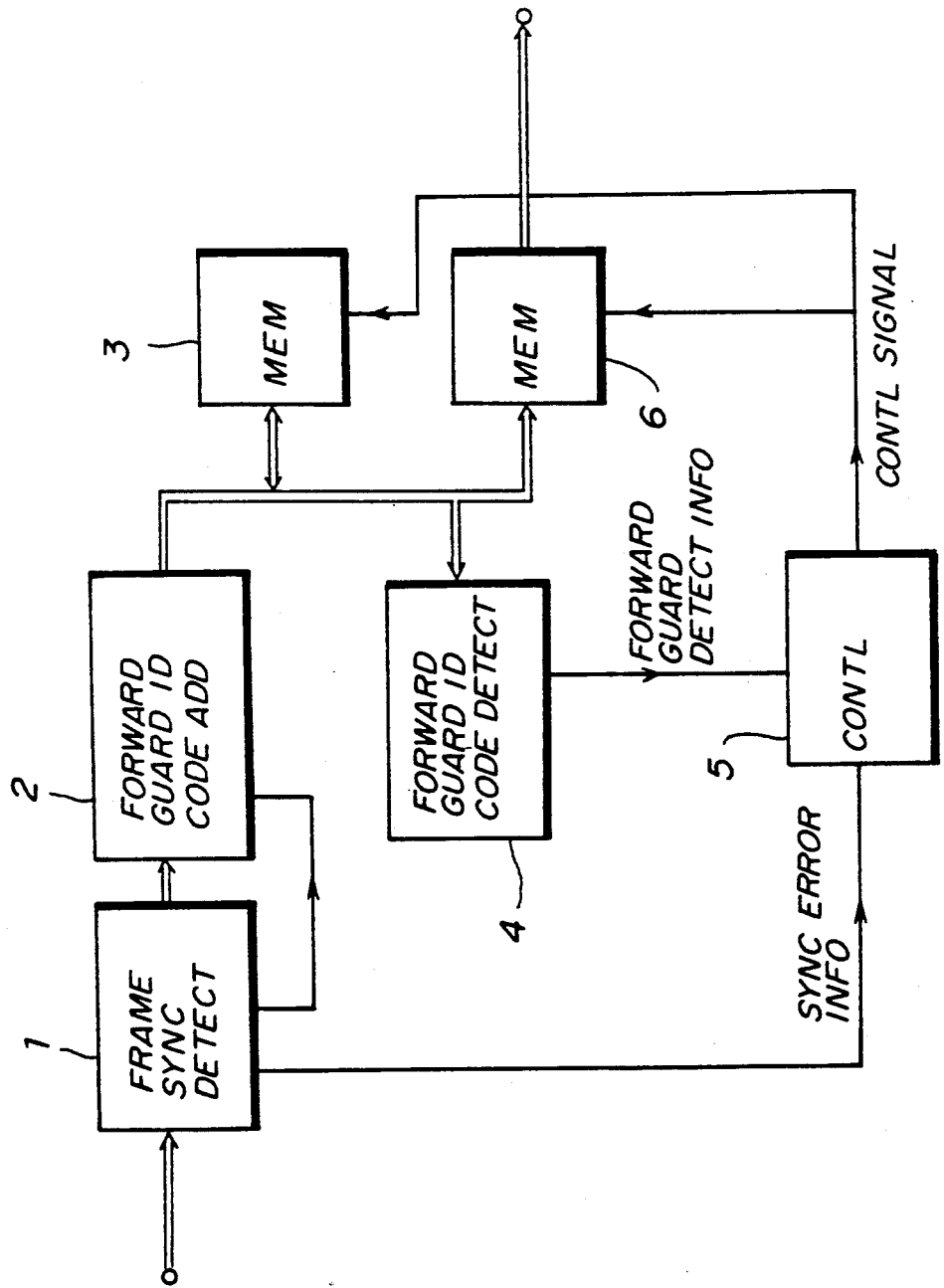
FIG. 2 is a system block diagram showing a first embodiment of a frame synchronization system according to the present invention.

The frame synchronization system shown in FIG. 3 includes in addition to the elements shown in FIG. 2 a serial-to-parallel (S/P) converter part 18 and a parallel-to-serial (P/S) converter part 19 which are connected as shown.

Figures 4A, 4B, 4C:
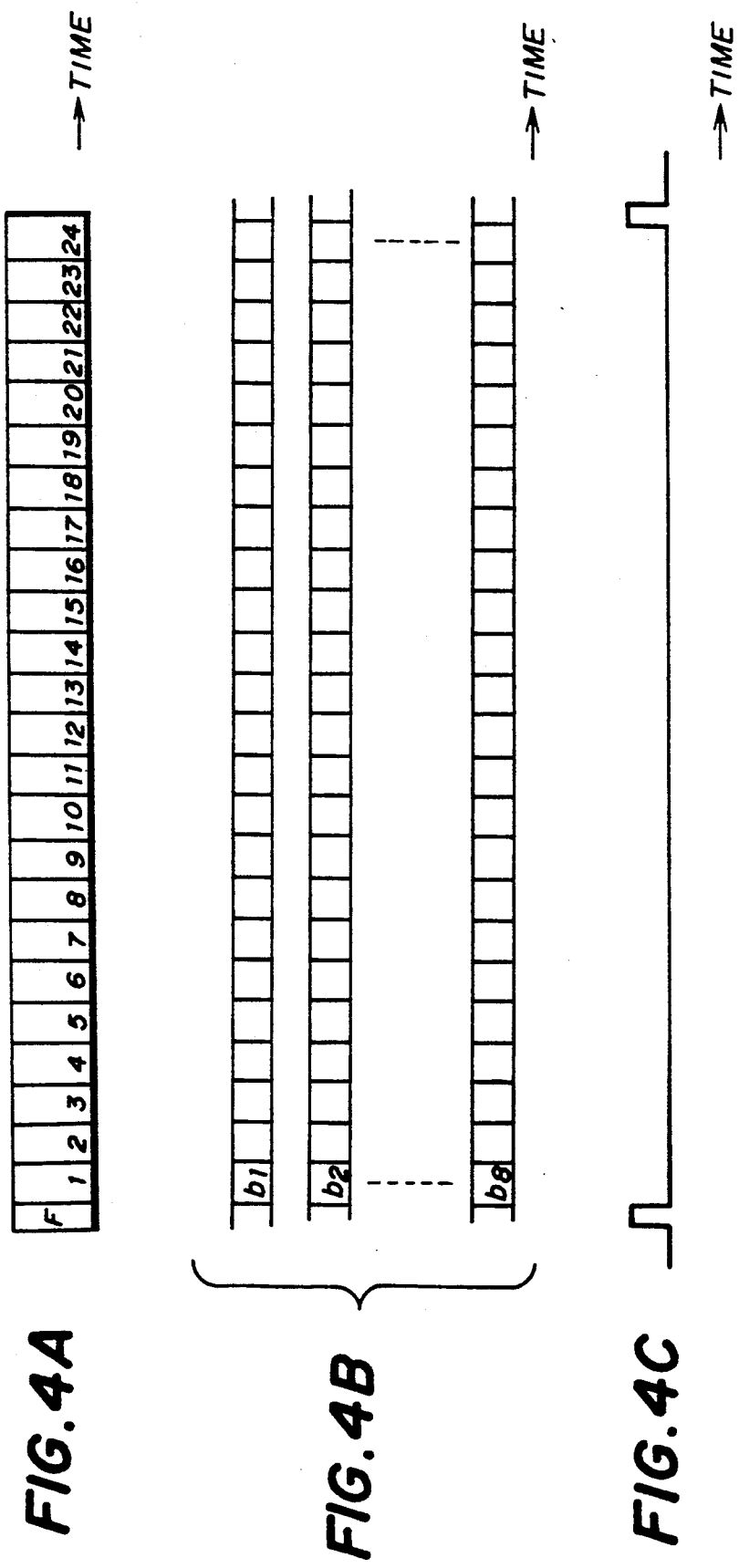

When a digital signal from the transmission line is input to the frame synchronization detector part 1, the frame synchronization detector part 1 detects whether or not the digital signal is synchronized based on frame synchronizing pulses included in the digital signal. FIG. 4A shows an embodiment of a signal format of the digital signal which is received from the transmission line, where F denotes a frame synchronization bit and frames "1" through "24". The frame synchronization detector part 1 supplies to the S/P converter part 18 the digital signal after frame synchronization is achieved. The S/P converter part 18 converts the digital signal which is transmitted serially on the transmission line into parallel digital signals shown in FIG. 4B. The parallel digital signals are supplied to the forward guard identification code adding part 2.

The forward guard identification code adding part 2 supplies the parallel digital signals to the input signal memory 3, and the parallel digital signals are stored in the input signal memory 3 under the control of the signal transfer controller part 5. When no abnormality is detected in the digital signal from the transmission line, the parallel digital signals stored in the input signal memory 3 are stored in the output signal memory 6 under the control of the signal transfer controller part 5 and are then read out from the output signal memory 6 and supplied to the P/S converter part 19 under the control of the signal transfer controller part 5. The P/S converter part 19 converts the parallel digital signals into a serial digital signal which is output as an output signal of the frame synchronization system.

Figures 6A, 6B:
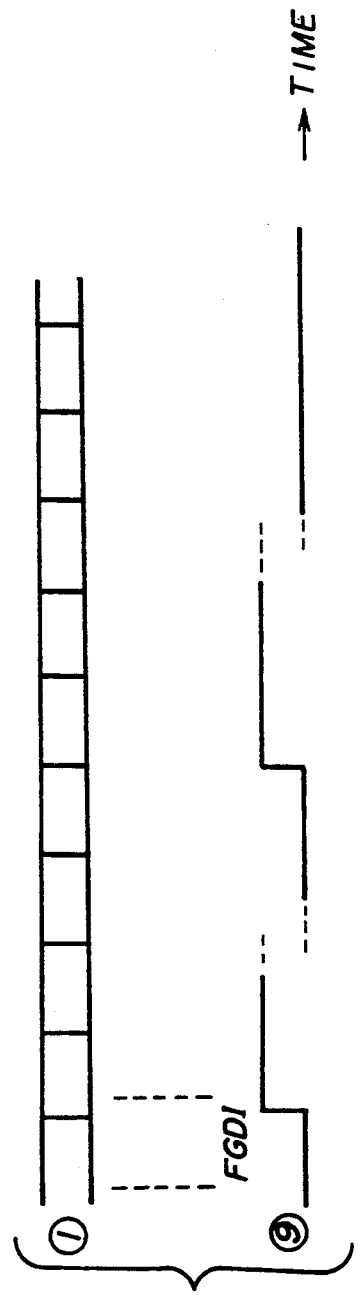

When the frame synchronization detector part 1 detects the synchronization error, the frame synchronization detector part 1 supplies to the signal transfer controller part 5 the synchronization error information shown in FIG. 5A. In FIG. 5A, FG denotes the forward guard, BG denotes a backward guard, and ADD denotes an interval in which the forward guard identification code is added to the digital signals in the forward guard identification code adding part 2. The frame synchronization detector part 1 also outputs a pulse signal shown in FIGS. 4C and 5B having a period of 8/24 kbps. The signal transfer controller part 5 produces a signal transfer control signal shown in FIG. 6A in response to the synchronization error information and the pulse signal so that the parallel digital signals stored in the input signal memory 3 are not stored in the output signal memory 6. In FIG. 6A, W denotes a write interval and R denotes a read interval.

Figures 7A, 7B:
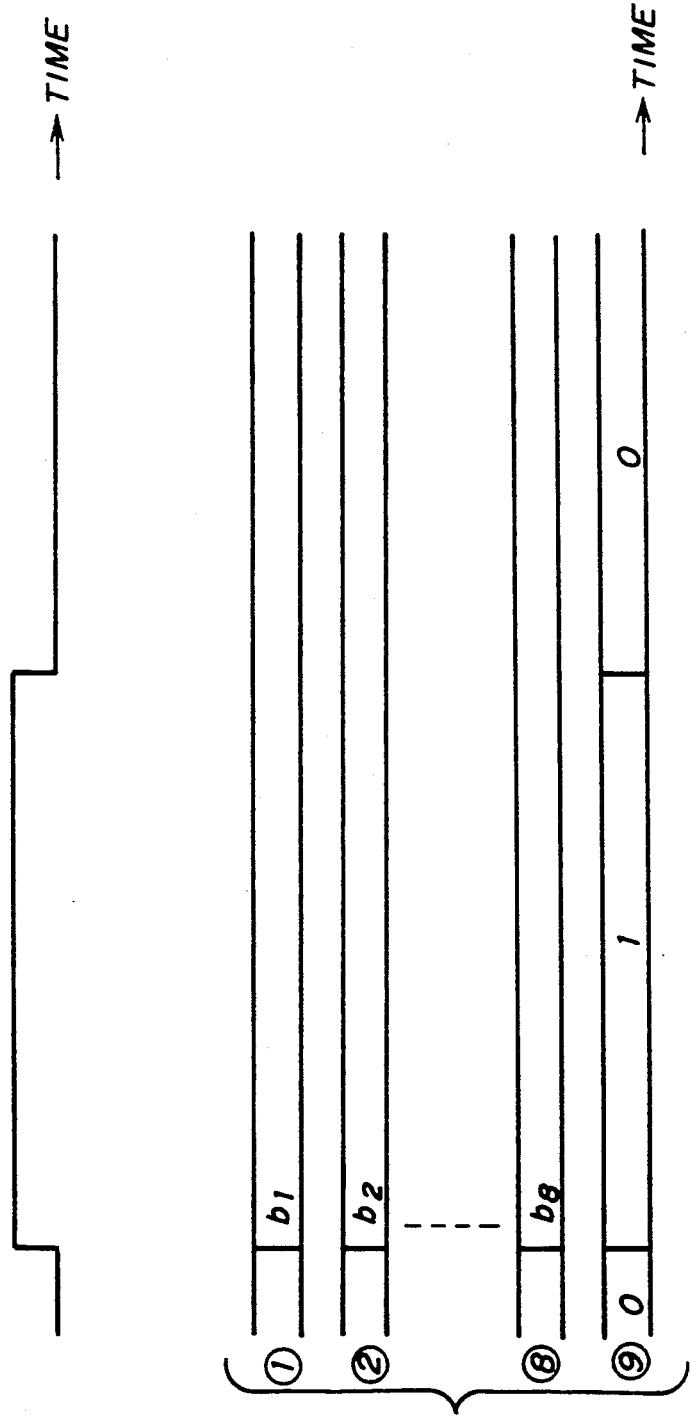

During the forward guard, the frame synchronization detector part 1 supplies to the forward guard identification code adding part 2 the forward guard information shown in FIGS. 5C and 7A. The forward guard identification code adding part 2 adds in the unit of multiframes the 1-bit forward guard identification code to the parallel digital signals for every time slot within the frame when the forward guard information is received. Hence, the parallel digital signals including the forward guard identification code shown in FIGS. 6B and 7B are output from the forward guard identification code adding part 2 to be stored in the input signal memory 3.

The forward guard identification code detector part 4 supplies to the signal transfer controller part 5 the forward guard detection information FGDI shown in FIG. 6B. The signal transfer controller part 5 produces the signal transfer control signal so that the parallel digital signals including the forward guard identification code are not stored in the output signal memory 16. Therefore, the digital signal of one frame before the synchronization error occurs is output from the P/S converter part 19 as the output signal of the frame synchronization system.

Figure 8:
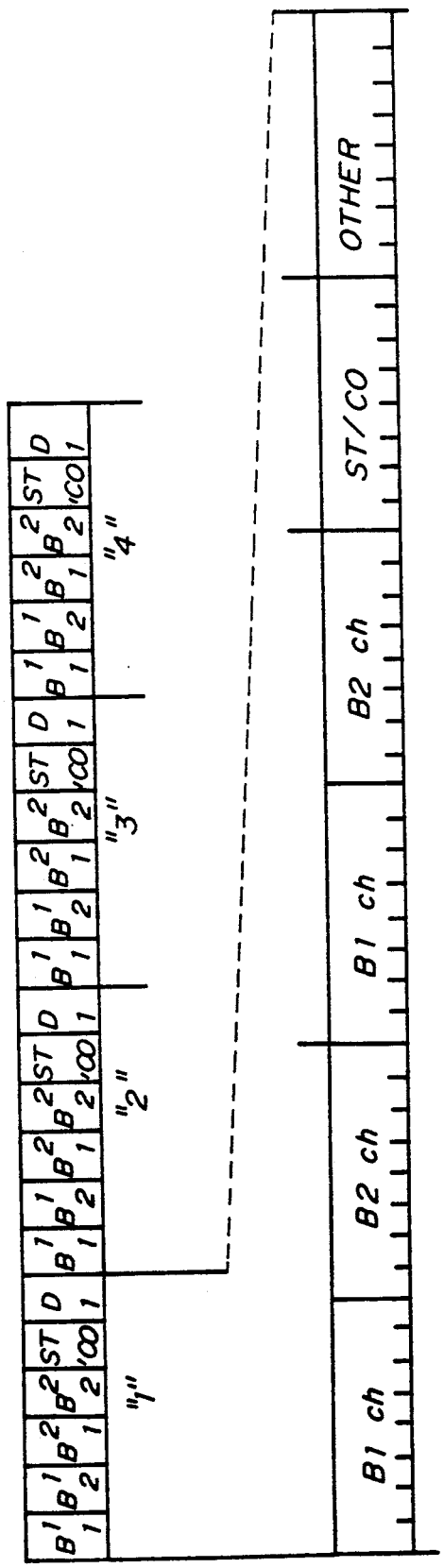
FIG. 8 shows an embodiment of a frame structure of a digital signal supplied to the frame synchronization system shown in FIG. 3.

FIG. 8 shows an embodiment of a frame structure of the digital signal which is received from the transmission line. One frame includes parts B1-Ch, B2-Ch, B1-Ch, B2-Ch, ST/CO and OTHER. Information signals in the first channel B1 are transmitted in the parts B1-Ch, while information signals in the second channel B2 are transmitted in the parts B2-Ch. A signal ST which indicates the state of a terminal is transmitted from the terminal to a switching system in the part ST/CO, or a signal CO which controls the terminal is transmitted from the switching system to the terminal in the part ST/CO. In this embodiment, the signals ST/CO are prevented from being output from the frame synchronization system during the forward guard, for example. Other appropriate information is transmitted in the part OTHER.

Further, the present invention is not limited to these embodiments, but various variations and modifications may be made without departing from the scope of the present invention.

What is claimed is:

1. A frame synchronization system comprising:
   frame synchronization detector means supplied with a digital signal including frame synchronizing pulses for outputting the digital signal in a frame synchronization state, said frame synchronization detector means having means for outputting synchronization error information when a synchronization error of the digital signal is detected and means for outputting forward guard information from a time when an abnormality of the frame synchronizing pulses is detected to a time when the synchronization error is detected;
   forward guard identification code adding means for adding a forward guard identification code to the digital signal output from said frame synchronization detector means when the forward guard information is received from said frame synchronization detector means;

first memory means for storing the digital signal including the forward guard identification code output from said forward guard identification code adding means;

forward guard identification code detector means for monitoring the digital signal read out from said first memory means and for outputting forward guard detection information when the digital signal read out from said first memory means includes the forward guard identification code;

second memory means for storing the digital signal read out from said first memory means in response to a control signal, the digital signal read out from said second memory means being output as an output signal of the frame synchronization system; and signal transfer controller means for producing a control signal which controls write and read operations of said first and second memory means in response to the synchronization error information and the forward guard detection information, said control signal prohibiting the digital signal read out from said first memory means from being stored in said second memory means when said signal transfer controller means receives at least one of the synchronization error information and the forward guard detection information.

2. The frame synchronization system as claimed in claim 1 wherein said control signal controls the read operation of said second memory means during an arbitrary frame so that a digital signal related to a frame preceding said arbitrary frame is read out from said second memory means and output as the output signal of the frame synchronization system when said signal transfer controller means receives at least one of the synchronization error information and the forward guard detection information during said arbitrary frame.

3. The frame synchronization system as claimed in claim 1 wherein the frame synchronization of the digital signal supplied to said frame synchronization detector means is achieved in a unit of multiframes, and said forward guard identification code adding means adds the forward guard identification code to the digital signal in a unit of multiframes for each time slot within a frame.

4. A frame synchronization system comprising:
frame synchronization detector means supplied with a serial digital signal including frame synchronizing pulses for outputting the serial digital signal in a frame synchronization state, said frame synchronization detector means having means for outputting synchronization error information when a synchronization error of the serial digital signal is detected and means for outputting forward guard information from a time when an abnormality of the frame synchronizing pulses is detected to a time when the synchronization error is detected;

first converter means for converting the serial digital signal output from said frame synchronization detector means into parallel digital signals;

forward guard identification code adding means for adding a forward guard identification code to the parallel digital signals output from said first converter means when the forward guard information is received from said frame synchronization detector means;

first memory means for storing the parallel digital signals including the forward guard identification code output from said forward guard identification code adding means;

forward guard identification code detector means for monitoring the parallel digital signals read out from said first memory means and for outputting forward guard detection information when the parallel digital signals read out from said first memory means include the forward guard identification code;

second memory means for storing the parallel digital signals read out from said first memory means in response to a control signal;

second converter means for converting the parallel digital signals read out from said second memory means into a serial digital signal which is output as an output signal of the frame synchronization system; and signal transfer controller means for producing a control signal which controls write and read operations of said first and second memory means in response to the synchronization error information and the forward guard detection information, said control signal prohibiting the parallel digital signals read out from said first memory means from being stored in said second memory means when said signal transfer controller means receives at least one of the synchronization error information and the forward guard detection information.

5. The frame synchronization system as claimed in claim 4 wherein said control signal controls the read operation of said second memory means during an arbitrary frame so that the parallel digital signals related to a frame preceding said arbitrary frame are read out from said second memory means and output via said second converter means as the output signal of the frame synchronization system when said signal transfer controller means receives at least one of the synchronization error information and the forward guard detection information during said arbitrary frame.

6. The frame synchronization system as claimed in claim 4 wherein the frame synchronization of the serial digital signal supplied to said frame synchronization detector means is achieved in a unit of multiframes, and said forward guard identification code adding means adds the forward guard identification code to the parallel digital signals in a unit of multiframes for each time slot within a frame.

* * * * *

UNITED STATES PATENT AND TRADEMARK OFFICE
CERTIFICATE OF CORRECTION

PATENT NO. : 5,107,495

DATED : April 21, 1992

INVENTOR(S) : Nobuhisa KAMOI et al.

It is certified that error appears in the above-identified patent and that said Letters Patent is hereby corrected as shown below:

Col. 1, line 51, change "cf" to --of--.

Signed and Sealed this

Twelfth Day of October, 1993

Attest:

BRUCE LEHMAN

Attesting Officer   Commissioner of Patents and Trademarks